United States Patent
Poore et al.

(10) Patent No.: US 11,886,650 B2
(45) Date of Patent: Jan. 30, 2024

(54) STYLUS-BASED INPUT SYSTEM FOR A HEAD-MOUNTED DEVICE

(71) Applicant: Apple Inc., Cupertino, CA (US)

(72) Inventors: Killian J. Poore, Santa Clara, CA (US); Stephen E. Dey, San Francisco, CA (US); Trevor J. Ness, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/795,458

(22) Filed: Feb. 19, 2020

(65) Prior Publication Data

US 2020/0333891 A1 Oct. 22, 2020

Related U.S. Application Data (60) Provisional application No. 62/836,291, filed on Apr. 19, 2019.

(51) Int. Cl.
| | |
|---|---|
| *G06F 3/00* | (2006.01) |
| *G06F 3/0354* | (2013.01) |
| *G06F 3/03* | (2006.01) |
| *G02B 27/01* | (2006.01) |

(52) U.S. Cl.
CPC ..... *G06F 3/03542* (2013.01); *G02B 27/0176* (2013.01); *G06F 3/0304* (2013.01); *G06F 3/03545* (2013.01)

(58) Field of Classification Search
CPC .............. G06F 3/03542; G06F 3/0304; G06F 3/03545; G02B 27/0176
See application file for complete search history.

(56) References Cited

U.S. PATENT DOCUMENTS

| | | | |
|---|---|---|---|
| 9,746,943 B1* | 8/2017 | Rost | G06F 3/03545 |
| 2016/0062492 A1* | 3/2016 | Geller | G06F 21/31 345/179 |
| 2016/0267720 A1* | 9/2016 | Mandella | G06F 1/1686 |
| 2016/0334891 A1* | 11/2016 | Ozoemenam | G01J 3/46 |
| 2018/0095555 A1* | 4/2018 | Gemerman | G06F 3/0383 |
| 2019/0102927 A1* | 4/2019 | Yokokawa | G06F 3/014 |
| 2019/0369752 A1* | 12/2019 | Ikeda | G02B 27/017 |
| 2020/0042111 A1* | 2/2020 | Connellan | G06F 3/017 |
| 2021/0208700 A1 | 7/2021 | Yamada et al. | |

\* cited by examiner

*Primary Examiner* — Michael A Faragalla
(74) *Attorney, Agent, or Firm* — BAKERHOSTETLER (57) ABSTRACT

A tracking system includes a stylus comprising a light emitter, a head-mounted device comprising an optical sensor configured to detect the light emitter, and a processor communicatively coupled to the optical sensor and configured to determine a position of the stylus based on detection of the light emitter.

18 Claims, 4 Drawing Sheets

STYLUS-BASED INPUT SYSTEM FOR A HEAD-MOUNTED DEVICE

CROSS-REFERENCE TO RELATED APPLICATIONS

This application claims the benefit of U.S. Provisional Application No. 62/836,291, entitled "STYLUS-BASED INPUT SYSTEM FOR A HEAD-MOUNTED DEVICE," filed Apr. 19, 2019, the entirety of which is incorporated herein by reference.

TECHNICAL FIELD

The described embodiments relate generally to input systems for electronic devices, and more particularly, to stylus-based input for a head-mounted device.

BACKGROUND

A head-mounted device can be worn by a user to display visual information within the field of view of the user. The head-mounted device can be used as a virtual reality (VR) system, an augmented reality (AR) system, and/or a mixed reality (MR) system. A user may observe outputs provided by the head-mounted device, such as visual information provided on a display. The display can optionally allow a user to observe an environment outside of the head-mounted device. Other outputs provided by the head-mounted device can include speaker output and/or haptic feedback. A user may further interact with the head-mounted device by providing inputs for processing by one or more components of the head-mounted device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mounted devices are an attractive technology for a variety of applications, and can be used to provide an immersive and interactive computer generated reality (CGR). For example, head-mounted devices can be used to provide VR or MR environments that are responsive to movements of a user in three-dimensional space for purposes such as gaming, video entertainment, and training simulations, among other possibilities. A head-mounted device can be equipped with sensors or motion tracking technology to track movements of the user's head, and generate an appropriate response in output of the head-mounted device (e.g., audio, graphics, etc.).

A system equipped with the ability to track or respond to other movements of the user or environment can provide greater immersion and new possibilities for the user experience. For example, the ability to track free space movements of the user's hands or other physical objects can allow for three-dimensional manipulation of objects in a CGR environment. Additionally, or in combination, it would be desirable to provide the user with additional tools with which the user can observe or otherwise interact with the physical environment while wearing a head-mounted device.

According to some embodiments disclosed herein, a system involving a head-mounted device and a handheld stylus can be used to track free-space movements of a user. The stylus can be equipped with one or more light emitters, and the head-mounted device can be equipped with an outward facing camera that is configured to transduce movements of the stylus based on detection of the light emitters. Such a system can provide a self-contained tracking system that allows a user to freely move the handheld stylus in three-dimensional space, while accurately transducing the free-space movements of the stylus without a need for external cameras.

Additionally, or in combination, the stylus can be equipped with one or more cameras to facilitate tracking of movements of the stylus or for gathering additional data from a physical environment around the stylus in order to affect output provide by the head-mounted device. For example, cameras in a stylus configured to provide a view to spaces that are obstructed or hidden from a field of view of a user wearing the head-mounted device, allowing a user to peer around objects in three-dimensional space with a stylus and view occluded or hidden spaces on the head-mounted device. In some embodiments, multiple cameras may be included in the stylus, such as one in the body region and one near the tip, so that the stylus is capable of both observing a three-dimensional environment around the stylus and an interface surface contacted by the tip of the stylus. Additionally, or in combination, one or more cameras in the stylus can be used to track light emitters in the head-mounted device to track a free space position of the stylus or improve an accuracy of a tracking determination made in combination with other data sources.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
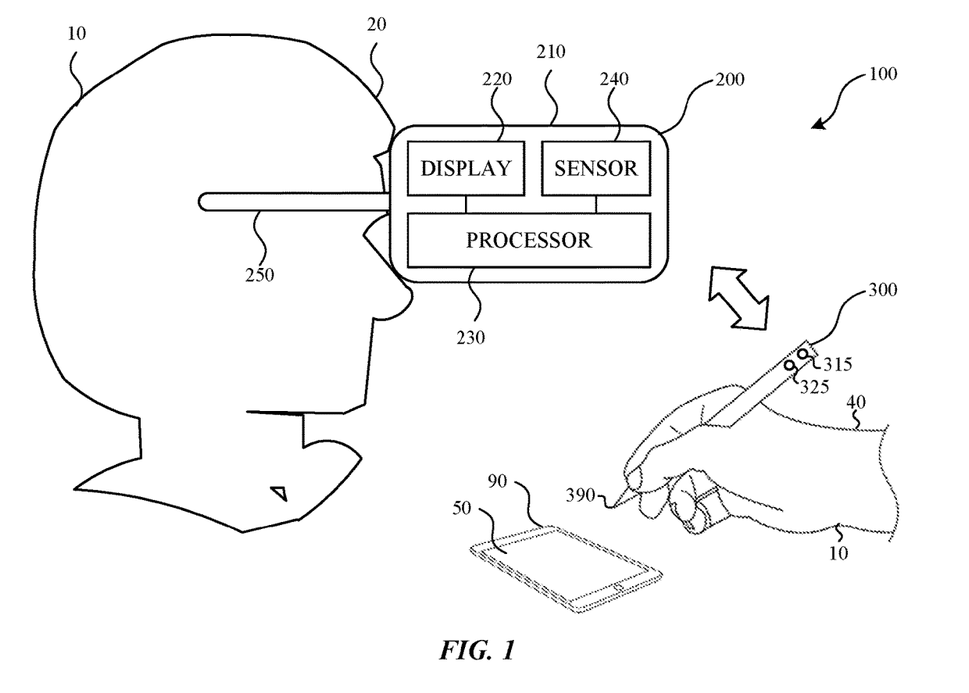
FIG. 1 illustrates a schematic diagram of an example of a system having a head-mounted device and a stylus, in accordance with some embodiments.

FIG. 1 shows an example of an electronic system 100 having a head-mounted device 200 and a stylus 300, in accordance with some embodiments. The head-mounted device 200 and the stylus 300 can each be configured for interaction with each other and with a user 10.

As seen in FIG. 1, the head-mounted device 200 is a wearable electronic device that is configured to be worn on a head 20 of a user 10. The head-mounted device 200 can be configured to provide output to the user 10 in the form of audio, graphics, haptics, and/or other observable outputs. The head-mounted device 200 can include a housing 210 that is securable to the user's head 20 via a securement element 250. The securement element 250 can include a band, a strap, a rim, temples of a glasses frame, or any other suitable mechanism that serves to secure and retain the housing 210 on the head 20 of the user 10. The securement element 250 can be an integral part of the housing 210 or be implemented as a separate component attached thereto. The housing 210 can further include or be coupled to one or more nose pads or other features that serve to rest the housing 210 on the nose of the user 10.

The housing 210 can enclose and support various functional components therein, such as integrated circuits, memory devices, processors, electronic circuitry, input/output devices, and/or other electronic components. In FIG. 1, the head-mounted device 200 is shown as including a display 220, a processor 230, and a sensor 240, which can be enclosed and/or supported by the housing 210. However, the head-mounted device 200 can include any number of components, which can be included in the housing 210 and/or securement element 250.

The display 220 can be configured to transmit light from a physical environment for viewing by the user 10. For example, the display 220 can be configured to present information in addition to (e.g., overlaid with) the physical environment viewed by the user 10. In such embodiments, the display 220 can, for example, include lens for vision correction or other optical elements for modifying the view of the physical environment seen by the user 10. Alternatively, the display 220 can be configured to present information to the exclusion of the physical environment. In either case, the display 220 can be configured to present graphics to, for example, present a CGR environment to the user 10. The display 220 can be an inward facing display, configured to face towards the eyes of the user 10 when the user is wearing the head-mounted device.

With continued reference to FIG. 1, the user 10 may interact with the stylus 300 while wearing the head-mounted device 200. The stylus 300 is a handheld device that can be held by a hand 40 of the user 10, and can support handling and operation by the user 10. For example, the stylus 300 may be configured as a wireless device that can be freely moved in three-dimensional space. The stylus 300 can be configured as a touch-based input device that provides input to the electronic system 100 and/or an external device 90 based on contact with a tip 390 at a terminal end of the stylus 300. The external device 90 can be any of a variety of electronic devices, such as, for example, a smart phone, tablet computer, laptop computer, desktop computer, wearable device, smart watch, portable electronic device, or other electronic device.

The tip 390 may be configured to contact an interface surface 50 to provide input. Such contact can be detected by the external device 90 and/or the stylus 300. For example, the stylus 300 can include one or more sensors that detect when the tip 390 contacts the interface surface 50. Alternatively, or in combination, the interface surface 50 may include a touch-sensitive panel or a digitizer to detect input when contacted by the stylus 300. Such a touch-sensitive panel may or may not overlap with a display screen of the external device 90, and inputs from the stylus 300 can be used to modify information on the display screen of the external device 90 (e.g., to provide navigational, pointing inputs, writing inputs, etc.). Sensors in the stylus 300 and/or external device 90 for detecting touch-based inputs from the stylus 300 can include one or more contact sensors, capacitive sensors, touch sensors, cameras, piezoelectric sensors, pressure sensors, photodiodes, and/or other sensors operable to detect contact with the interface surface 50. Alternatively, or in combination, the electronic system 100 can be configured to use inactive surfaces or any surfaces of the environment as the interface surface 50, for example, by transducing movements of the stylus 300 using sensors in the head-mounted device 200 and/or stylus 300, and converting such inputs into a visible response presented on the display 220 of the head-mounted device.

The system 100 can be configured to track position, orientation, and/or movement of the stylus 300 in three-dimensional space. Additionally, or in combination, features of the stylus 300 can be used to gather data from a physical environment, which can be used to affect an output provided by the head-mounted device 200 to the user 10.

As seen in FIG. 1, the stylus can include a light emitter 315. The light emitter 315 can emit light in the visible (e.g., red, green, blue, etc.) and/or invisible spectrum (e.g., infrared, ultraviolet, etc.), which can be detected or tracked by the head-mounted device 200. For example, the sensor 240 of the head-mounted device can include an optical sensor such as a camera sensitive to the light emitted by the light emitter 315. The camera can be configured as an outward facing camera configured to face away from the head 20 of the user 10, so that the camera has a field of view to an environment external to the head-mounted device 200. For example the outward facing camera may have a field of view that is configured to overlap with the user's field of view.

The processor 230 can be coupled to the sensor 240 and configured to process data from the sensor 240 to determine a position of the stylus 300 in three-dimensional space. For example, the processor 230 may analyze images from the sensor 240 to detect a distinctive point or points in the images that correspond to the light emitter 315. The processor 230 may analyze an image captured with the sensor 240 to detect the light emitter 315 in the image using any standard object detection or tracking algorithm, where the light emitter provides a highly distinctive and discriminative point for determining the location of the stylus. Motion tracking may be accomplished by detecting the light emitter 315 across a sequence of the images, and determining a motion vector for the light emitter 315 across different images to determine changes in the position of the light emitter 315 that correspond to movement of the stylus 300. In some embodiments, the light emitter 315 may include a pair of light sources separated by a known fixed distance, which may be triangulated by the processor 230 to determine rotation, scaling, or other movements that may be difficult to discriminate using only a single light emitter or single discriminative point tracked across the images.

The head-mounted device 200 can be further configured to display graphics on the display 220 based on the detection of the light emitter 315. For example, the processor 230 can be configured to generate a virtual object in a CGR presented on the display 220, where the position of the virtual object displayed in the CGR environment corresponds to the determined position of the stylus 300. Additionally or alternatively, the processor 230 can be configured to track movements, orientation, or other free-space characteristics of the stylus 300 based on detection of the light emitter 315 and translate such characteristics to a graphical response or other output presented on the head-mounted device 200.

With continued reference to FIG. 1, the stylus 300 can include a camera 325. The camera 325 can be configured to optically image a physical environment outside of the stylus 300. Such image information can be used to track a position of the stylus 300. For example, the camera 325 of the stylus 300 can be used to track movements in environmental features, and position or movement of the stylus 300 can be determined based on the movements in the environmental features detected with the camera 325. In some embodiments, the head-mounted device 200 can be equipped with a light emitter or other visual target, and the camera 325 of the stylus 300 can be used to detect the light emitter of the head-mounted device 200. Such information can be used alone, or in combination with other collected data, such as the data gathered by tracking the light emitters. Combining such data can enhance the accuracy or increase the confidence of tracking determinations made by the system 100.

Additionally, or in combination, information from the camera 325 can be used to gather additional data regarding the physical environment of the system. For example, the camera 325 may be used to collect data or image spaces that are hidden or occluded from a field of view of the user 10 and/or the sensor 240 of the head-mounted device 200. Such data can be used to map a topography of the physical environment within which the electronic system 100 is operated. For example, the mapping may be used to affect how virtual objects of a mixed reality environment interact with the physical environment. Additionally, or in combination, such data can be used to permit the user 10 to view, on the display 220 of the head-mounted device 200, spaces of the physical environment that are otherwise hidden from the field of view of the user 10. For example, images of the environment captured with the camera 325 of the stylus 300 can be directly presented on the display 220 of the head-mounted device 200 to permit the user 10 to peer around or inside of objects in the physical environment. Such images can include still images and/or images form a video. In some embodiments, the video captured with the camera 325 of the stylus 300 can be presented on the head-mounted device in real time to permit the user to view hidden or occluded spaces on the head-mounted device using the stylus like a periscope.

Additionally, or in combination, the stylus 300 and/or the head-mounted device 200 can include one or more other sensing components, which can include non-optical sensing components such as, for example, ultrasonic sensing components and/or electromagnetic sensing components. For example, the head-mounted device 200 may equipped with an electromagnetic transmitter, and the stylus 300 may be equipped with an electromagnetic receiver configured to receive electromagnetic signals from the transmitter on the head-mounted device 200. As another example, ultrasonic transducers that are each configured to both transmit and receive can be included on each of the stylus 300 and the head-mounted device 200 to facilitate tracking. It is also contemplated that various other combinations of transmitters, receivers, or transmitter/receivers can be suitably used in the head-mounted device 200 and the stylus 300 to facilitate tracking of the stylus.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 2:
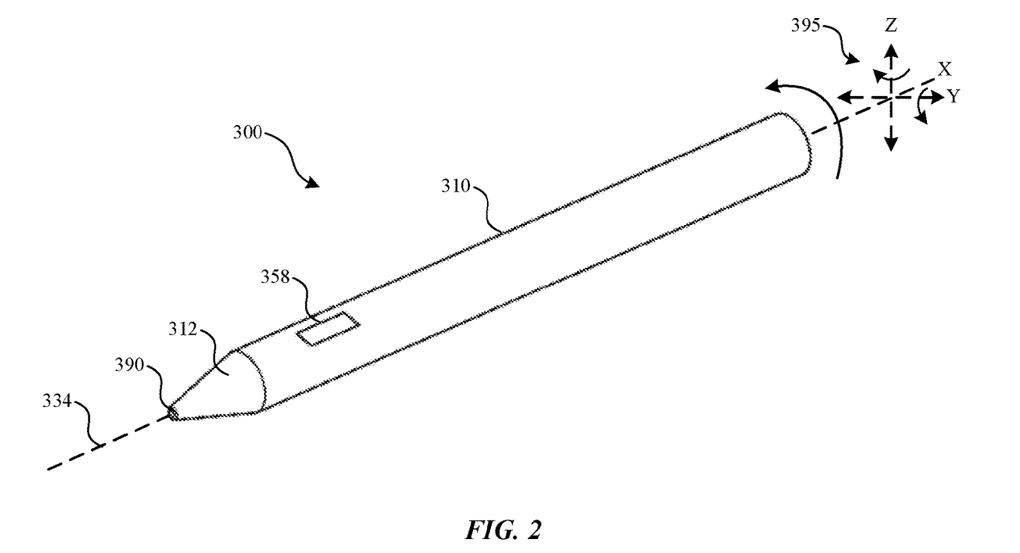
FIG. 2 illustrates a perspective view of an example of a stylus, in accordance with some embodiments.

FIG. 2 illustrates an example of the stylus 300, in accordance with some embodiments. The stylus 300 can include a body 310 that extends at least a portion of the total length of the stylus 300. The body 310 can be an elongate, pen-like body to permit the user 10 to grip or manipulate the stylus 300 like a pen or writing instrument. The user 10 can grip the stylus 300 at the body 310, for example near the tip 390. The stylus 300 can include a tapered end 312 that tapers, along a longitudinal length of the stylus 300, from an outer diameter of the body 310 toward a point at the tip 390, for example, along a central longitudinal axis 334 defined by the elongate body.

The stylus 300 may further include a control input 358. The control input 358 may be an input component design to receive commands separate from touch inputs provided by the tip 390. For example, the control input 358 can include a button, touch sensor, microphone, or other input component capable of receiving inputs from the hand 40 or other part of the user 10. The control input 358 can be used to activate components of the stylus 300, change operating modes, change settings, or provide other functionality in support of stylus-based input to the electronic system 100. For example, the control input 358 can be used to power up or power down the stylus 300, activate the light emitter 315, activate the camera 325, activate a shutter of the camera 325, trigger selection, navigation, or gaming inputs in a CGR presented on the head-mounted device 200, and/or provide other inputs.

FIG. 2 shows an example of a coordinate system 395 that may be used to define free space movements of the stylus. It is contemplated that other coordinate systems may be used or may be equivalent to the Cartesian coordinate system shown in FIG. 2 for purposes of tracking position, motion, or orientation of the stylus. Further, the coordinate system 395 is shown defined relative to the stylus 300. However, it will be appreciated that equivalent calculations may be made with respect to coordinate systems defined relative to other frames of reference, such as with relative to the head-mounted device or a gravitational frame of reference.

As seen in FIG. 2, the stylus 300 or the body 310 stylus may be freely movable in three-dimensional space such that it has six degrees of freedom in three-dimensional space. The coordinate system 395 is shown with mutually orthogonal X, Y, and Z axes. The X-axis is shown as coinciding with the longitudinal axis 334 of the stylus, and the Y and Z axes extend transverse to, and are orthogonal to, the longitudinal axis 334 and to each other. Free space movements of the stylus 300 can include translation along any of the axes and rotation about any of the axes. For example, the position of the stylus 300 may be changed by translational movements along any of the X, Y, or Z axes. As another example, the orientation of the stylus 300 may be changed by rotational movements about any of the X, Y, or Z axes. Rotation about the longitudinal axis 334 (X-axis) can be referred to as a roll, and the longitudinal axis 334 can be referred to as a roll axis. Rotational movements about the other two axes can be referred to as pitch and yaw.

According to some embodiments, a tracking system as described herein may be configured to determine position along any one or more of the X, Y, or Z axes. The position determination can include determination of absolute position, relative position, and/or changes in position (translation) along any or all of such axes. Additionally or alternatively, a tracking system as described herein can be configured to determine orientation about any one or more of the X, Y, or Z axes. The orientation determination can include determination of absolute orientation, relative orientation, and/or changes in orientation about any or all of such axes.

Figure 3:
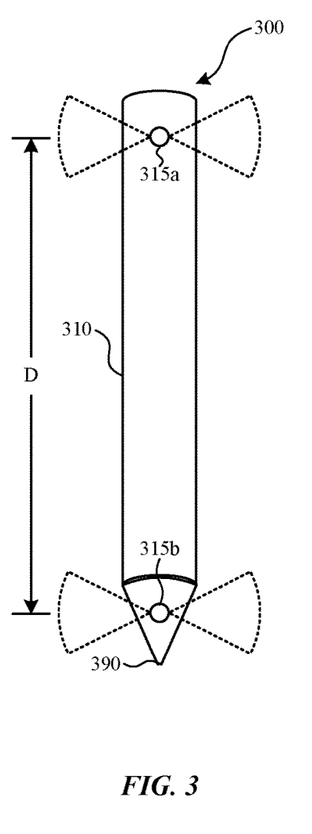
FIG. 3 illustrates a front view of an example of a stylus having one or more light emitters, in accordance with some embodiments.
Figure 4:
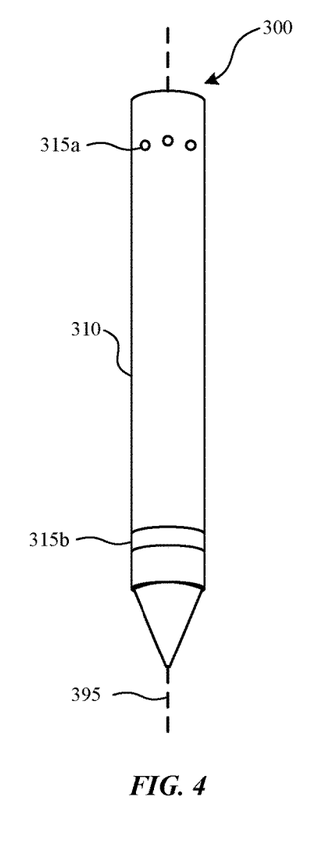
FIG. 4 illustrates a front view of an example of a stylus having a pair of light emitters with different spatial patterns, in accordance with some embodiments.
Figure 5:
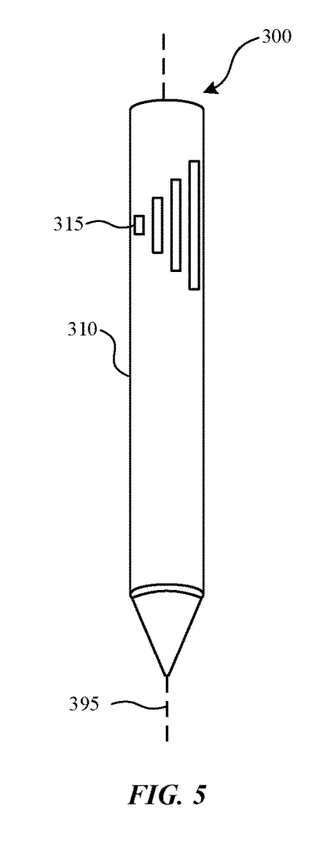
FIG. 5 illustrates a front view of an example of a stylus having a light emitter with a pattern that varies about a circumference of the stylus, in accordance with some embodiments.

FIGS. 3-5 illustrate examples of the stylus 300 including the light emitter 315, in accordance with some embodiments. The light emitter 315 can include any appropriate light emitting device or light source that is configured to emit light in the visible and/or invisible spectrum. Examples include light emitting diodes (LEDs), lasers, electroluminescent wires, and other electroluminescent devices. In some embodiments, the light emitter 315 may be implemented as one or more infrared (IR) LEDs, positioned within a housing of the stylus 300, and configured to transmit infrared light through an infrared transmissive material of at least a portion of the housing of the stylus 300. Such features may enhance a cosmetic design by rendering the LED(s) invisible to the naked eye of the user and allowing the appearance of a smooth opaque outer housing.

FIG. 3 illustrates an example in which the light emitter 315 includes a pair of light emitters 315a and 315b spaced apart longitudinally along a length of the body 310 (spaced apart along longitudinal axis 334). Although a pair of light emitters is shown, it will be appreciated that various embodiments can include any number of light emitters. FIG. 3 illustrates cones of light 317 propagating radially outward from body 310. However, it will be appreciated that the light emitters 315a and 315b can be configured to emit light having any appropriate spatial characteristics or other emission characteristics, such as diffuse light, collimated light, polarized light, etc., which propagate outward in any appropriate directions to permit detection by the sensor 240 of the head-mounted device 200.

The pair of light emitters 315a and 315b are shown positioned at opposing end portions of the body 310 of the stylus 300. The pair of light emitters includes a first light emitter 315a positioned near a proximal or rear end of the stylus 300, and a second light emitter 315b positioned near a distal or front end of the stylus 300, which corresponds to the end portion containing the tip 390. Positioning the light emitters at opposing ends or opposing end portions can generally increase a separation distance D compared to implementations in which the pair of light emitters 315a and 315b are positioned closer together longitudinally, e.g., near a center portion of the body. Use of a pair of light emitters spaced apart longitudinally, compared to implementations using a single light emitter, may better allow the system to determine orientation information of the stylus 300, e.g., pitch or yaw about the Y or Z axes shown in FIG. 2. Greater separation distance may increase the accuracy or resolution of the determination. The multiple light emitters may also facilitate position tracking by providing a view from the camera for one of the light emitters in cases where another light emitter is occluded. The separation distance D can generally be any non-zero amount up to 100% of the total length of the stylus. In embodiments in which the pair of light emitters are disposed at opposing end portions of the stylus, the separation distance can be at least 75% of the total length of the stylus 300.

The pair of light emitters 315a and 315b may emit light having identical characteristics to each other. Alternatively, the pair of light emitters 315a and 315b may having distinct and distinguishable characteristics of light that they emit. For example, the pair of light emitters may be configured to emit light of different wavelengths or colors. Additionally, or in combination, the pair of light emitters may have different spatial patterns. Providing the pair of light emitters with distinguishable characteristics can allow the system to disambiguate an orientation of the stylus 300. For example, when the orientation of the stylus is determined based on detection of the pair of light emitters 315a and 315b with a camera in the head-mounted device 200, the processor 230 may be unable to resolve a 180-degree ambiguity in the orientation of the stylus, thereby creating an ambiguity as to which direction the tip 390 is pointed towards and from which direction the tip 390 is pointed away. In accordance with some embodiments, the processor 230 may be configured to disambiguate the orientation of the stylus 300 based on the relative positions of the light emitters, e.g., based on the relative positions of the different emitted wavelengths and/or different spatial patterns.

FIG. 4 illustrates an example in which the pair of light emitters 315a and 315b have different spatial patterns, in accordance with some embodiments. In the illustrated example, the first light emitter 315a is configured as a series of dots or discrete segments arranged along a circumference of the body 310, or stated another way, arranged circumferentially about the longitudinal axis 334. The second light emitter 315b is arranged as a circumferential ring about the longitudinal axis of the body 310. However, it is contemplated that the different light emitters may use any spatial patterns that are distinct or distinguishable. Further, the different spatial patterns may be achieved in any suitable manner, such as, for example, via the use of differently sized or shaped LEDs in the different light emitters, or via different cutouts or housing openings that permit different spatial arrangements of light to propagate therethrough.

According to some embodiments, a circumferentially arranged series of dots or discrete segments around the stylus, as in the first light emitter 315a shown in FIG. 4, may cause the appearance of the first light emitter 315a to change as the body 310 is rotated about the longitudinal axis 334. An external camera such as a camera in the head-mounted device 200 may be capable of detecting such changes so that the system can determine changes or rotation of the stylus.

This can allow a user to, for example, spin a virtual object or otherwise interact with the CGR environment with a greater degree of freedom.

According to some embodiments, for example as shown in FIG. 5, the light emitter 315 may have a circumferentially varying pattern that varies in an absolute or graded sense so as to permit the system to determine an angular position of the stylus about the longitudinal axis 334. FIG. 5 illustrates an example of the stylus 300 in which the circumferentially varying pattern includes a series of discrete bares that can be seen by the camera as successively longer based on the angular position of the stylus 300. However, it is contemplated that any circumferentially varying pattern with multiple distinguishable points at different angular positions may be used. For example, the wavelength or color of the light emitter may vary along the circumference, or any other suitably detectable spatial pattern may be used.

Figure 6:
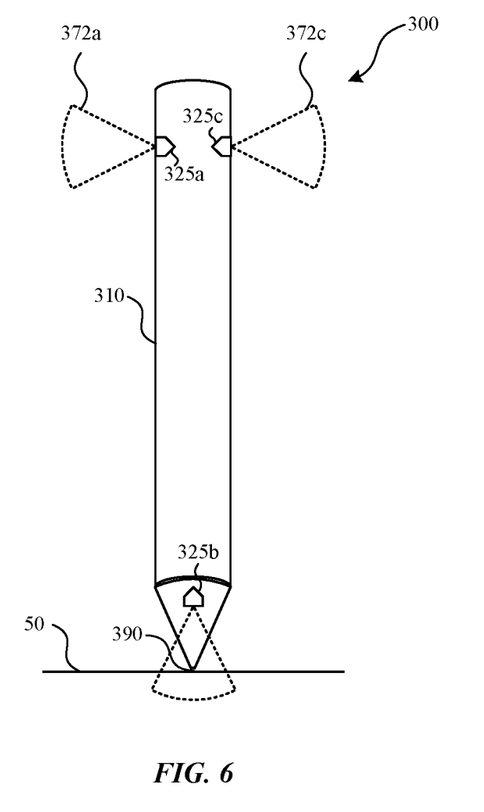
FIG. 6 illustrates a front view of an example of a stylus having multiple cameras, in accordance with some embodiments.

According to some embodiments, the stylus 300 may include a camera 325 to facilitate tracking and/or gathering of data. The camera 325 is configured to capture images from an environment outside of the stylus, and can include, for example, an image sensor having an array of photodiodes and a lens or optics for focusing an image onto the image sensor array. FIG. 6 illustrates an example in which multiple cameras are included in the stylus 300 for sensing different types of information. However, it is contemplated that various embodiments may include any one or more of the cameras shown in FIG. 6, and/or additional cameras.

As seen in FIG. 6, the stylus can include a pair of cameras 325a and 325b pointed in different directions. A first camera 325a can have a first field of view 372a pointed radially outward from the body 310. The first camera 325a is also shown in a proximal or rear end portion of the stylus 300 on the body 310. The first camera 325a may be configured to capture images of the environment outside or around the stylus 300, such as, for example, to ergonomically permit the user to peer around object, and/or to capture images of a surrounding environment while the tip 390 is contacting the interface surface 50.

A second camera 325b can have a second field of view 372b pointed towards the tip 390. The second camera 325b can be configured to view the interface surface 50. The second camera 325b may be used to, for example, track motions of the stylus as it is moved along or across the surface. Such a camera may track changes seen in the texture of the interface surface 50 to determine motion of the stylus, for example, to implement writing or drawing functionality in a mixed reality environment across substantially any surface. Additionally or alternatively, the second camera 325b may be used to sample colors or other characteristics of a physical environment contacted by or in proximity to the tip 390.

According to some embodiments, a third camera 325c can be positioned on the body 310 with another third field of view 372c pointed radially outward from the body 310, at an opposite or otherwise different direction from the first field of view 372a. Using two or more cameras pointed radially outward from the body may permit a wider field of view to a region around the body 310 of the stylus 300, optionally up to a 360 degree view around the stylus.

Figure 7:
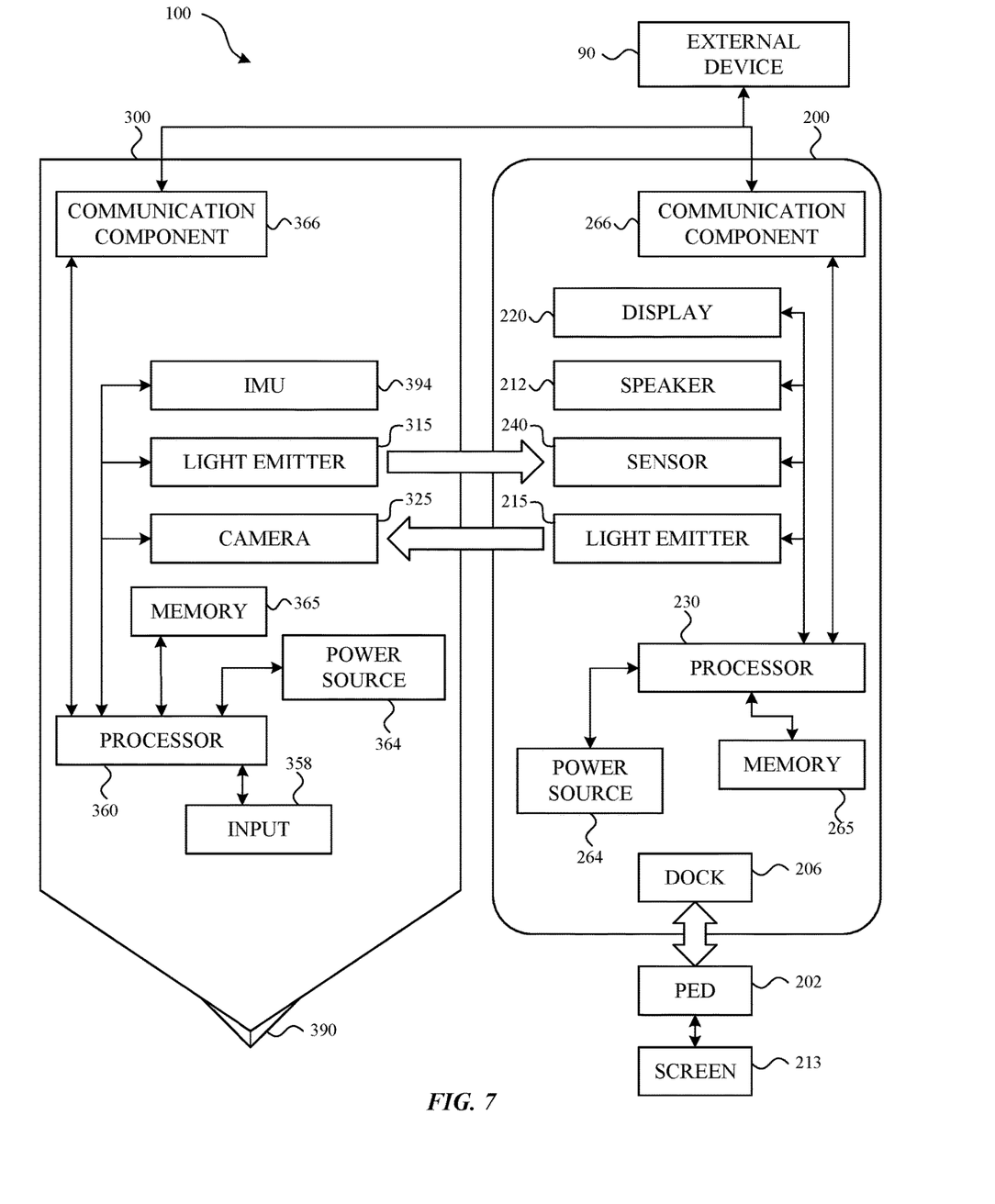
FIG. 7 illustrates a block diagram of an example of a system having a head-mounted device and a stylus, in accordance with some embodiments.

The electronic system 100 can be provided with components that facilitate the operation thereof. FIG. 7 illustrates various components of the system 100, including components of the head-mounted device 200 and the stylus 300, in accordance with some embodiments.

As shown in FIG. 7, the stylus 300 can include the tip 390 for contacting a surface, such as the interface surface 50 of an external device 90. The tip can be integrated with a sensor, such as one or more contact sensors, capacitive sensors, touch sensors, cameras, piezoelectric sensors, pressure sensors, photodiodes, and/or other sensors. Additionally or alternatively, the tip 390 can be made conductive to facilitate passive sensing therewith.

According to some embodiments, the stylus 300 can include a processor 360 with one or more processing units that include or are configured to access a memory 365 having instructions stored thereon. The instructions or computer programs may be configured to perform one or more of the operations or functions described with respect to the stylus 300. The processor 360 can be implemented as any electronic device capable of processing, receiving, or transmitting data or instructions. For example, the processor 360 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 365 can store electronic data that can be used by stylus 300. For example, the memory 365 can store electrical data or content such as, for example, audio and video files, documents and applications, device settings and user preferences, timing and control signals or data for the various modules, data structures or databases, and so on. The memory 365 can be configured as any type of memory. By way of example only, the memory 365 can be implemented as random access memory, read-only memory, Flash memory, removable memory, or other types of storage elements, or combinations of such devices.

According to some embodiments, the stylus 300 can include a communication component 366 for communicating with the external device 90 and/or the head-mounted device 200. The communication component 366 can include one or more wired or wireless components, WiFi components, near field communication components, Bluetooth components, and/or other communication components. The communication component 366 can include one or more transmission elements, such as one or more antennas. Alternatively or in combination, the communication component 366 can include an interface for a wired connection.

According to some embodiments, the stylus 300 can include a power source 364, such as one or more batteries and/or power management units. The stylus 300 can include components for charging the power source 364. The power source 364 can be used to power electronic components such as the processor 360, the light emitter 315, and the camera 325.

According to some embodiments, the stylus 300 can include the light emitter 315. The light emitter 315 can be configured to emit light to sensor 240 of the head-mounted device 200 for tracking the stylus 300, as further described herein. Additionally or alternatively, the stylus 300 can include other types of emitters or transmitters that can be detected by a sensor in the head-mounted device 200. For example, the light emitter 315 can be replaced with, or the stylus 300 can include in addition to the light emitter 315, an ultrasonic or electromagnetic transmitter that transmits signals that are received by the head-mounted device 200 to facilitate tracking of the stylus 300. The sensor 240 of the head-mounted device 200 can include an optical sensor, ultrasonic sensor, electromagnetic sensor, or other type of sensor configured to detect emitted light or otherwise receive signals from the stylus 300.

According to some embodiments, the stylus 300 can include the camera 325. The camera can be configured to capture data from an environment outside the stylus 300 and/or from a light emitter 215 or other visual target of the head-mounted device 200. According to some embodiments, images captured with the camera 325 can be transmitted to the head-mounted device 200, via the communication component 366, and presented on the display 220 of the head-mounted device 200. Additionally or alternatively, the stylus 300 can include other types of sensors or receivers that can detect the head-mounted device 200. For example, the camera 325 can be replaced with, or the stylus 300 can include in addition to the camera 325, an ultrasonic or electromagnetic sensor that receives signals that are transmitted by the head-mounted device 200 to facilitate tracking of the stylus 300. The sensor 240 of stylus 300 can include an optical sensor, ultrasonic sensor, electromagnetic sensor, or other type of sensor configured to detect emitted light or otherwise receive signals from the head-mounted device 200.

According to some embodiments, the stylus 300 can include an inertial measurement unit (IMU) 394. The IMU 394 can be configured to detect movements, position, or orientation of the stylus 300 in free space independently from the head-mounted device 200. The IMU 394 can include one or more orientation detectors, gyroscopes, accelerometers, and/or other inertial measurement components. According to some embodiments, data from the IMU 394 may be combined with data obtained from the sensor 240 of the head-mounted device 200 and/or data from the camera 325, to enhance an accuracy or confidence in tracking determinations.

According to some embodiments, the stylus 300 can include the control input 358. The control input 358 can be used to activate or trigger or more functions of the stylus 300 and/or features of a CGR environment in the head-mounted device 200, as further described herein.

According to some embodiments, the head-mounted device 200 can include a communication component 266 for communicating with the external device 90 and/or the stylus 300. The communication component 266 can include one or more wired or wireless components, WiFi components, near field communication components, Bluetooth components, and/or other communication components. The communication component 266 can include one or more transmission elements, such as one or more antennas. Alternatively or in combination, the communication component 266 can include an interface for a wired connection.

According to some embodiments, the head-mounted device 200 can include a processor 230 with one or more processing units that include or are configured to access a memory 265 having instructions stored thereon. The instructions or computer programs may be configured to perform one or more of the operations or functions described with respect to the stylus 300. The processor 230 can be implemented as any electronic device capable of processing, receiving, or transmitting data or instructions. For example, the processor 230 may include one or more of: a microprocessor, a central processing unit (CPU), an application-specific integrated circuit (ASIC), a digital signal processor (DSP), or combinations of such devices.

The memory 265 can store electronic data that can be used by the head-mounted device 200. For example, the memory 265 can store electrical data or content such as, for example, audio and video files, documents and applications, device settings and user preferences, timing and control signals or data for the various modules, data structures or databases, and so on. The memory 265 can be configured as any type of memory. By way of example only, the memory 265 can be implemented as random access memory, read-only memory, Flash memory, removable memory, or other types of storage elements, or combinations of such devices.

The head-mounted device 200 can further include a display 220 for displaying visual information for a user. The display 220 can provide visual (e.g., image or video) output. The display 220 can be or include an opaque, transparent, and/or translucent display. The display 220 may have a transparent or translucent medium through which light representative of images is directed to a user's eyes. The display 220 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mounted device 200 can include an optical subassembly configured to help optically adjust and correctly project the image based content being displayed by the display 220 for close up viewing. The optical subassembly can include one or more lenses, mirrors, or other optical devices.

Head-mounted device 200 can include a power source 264, which can charge and/or power components of the head-mounted device 200. The power source 264 can also charge and/or power components connected to the head-mounted device 200, such as a portable electronic device 202, as discussed further herein.

The head-mounted device 200 can include the speakers 212. The speakers 212 can be operably connected to the processor 230 for outputting audio. The audio from the speakers 212 can, for example, be presented in coordination with output of the display 220 for providing a part of a CGR environment.

The head-mounted device 200 can optionally include or connect to a portable electronic device 202, which can provide certain functions. For the sake of brevity, the portable electronic device 202 will not be described in detail in FIG. 2. It should be appreciated, however, that the portable electronic device 202 may be embodied in a variety of forms including a variety of features, all or some of which can be utilized by the head-mounted device 200 (e.g., input/output, controls, processing, battery, etc.). The portable electronic device 202 can provide a handheld form factor (e.g., small portable electronic device which is light weight, fits in a pocket, etc.). Although not limited to these, examples include media players, phones (including smart phones), PDAs, computers, and the like. The portable electronic device 202 may include a screen 213 for presenting the graphical portion of the media to the user. The screen 213 can be utilized as the primary screen of the head-mounted device 200.

The head-mounted device 200 can include a dock 206 operative to receive the portable electronic device 202. The dock 206 can include a connector (e.g., Lightning, USB, FireWire, power, DVI, etc.), which can be plugged into a complementary connector of the portable electronic device 202. The dock 206 may include features for helping to align the connectors during engagement and for physically coupling the portable electronic device 202 to the head-mounted device 200. For example, the dock 206 may define a cavity for placement of the portable electronic device 202. The dock 206 may also include retaining features for securing portable electronic device 202 within the cavity. The connector on the dock 206 can function as a communication interface between the portable electronic device 202 and the head-mounted device 200.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) or § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A tracking system comprising:
a stylus comprising multiple light emitters, each of the light emitters having a size that is different than a size of every other one of the light emitters, wherein the light emitters comprise a first light emitter and a second light emitter, wherein the second light emitter is spaced apart from the first light emitter along a length of the stylus, wherein the first and second light emitters are configured to emit different wavelengths of light; and
a head-mounted device comprising:
an optical sensor configured to detect the light emitters; and
a processor communicatively coupled to the optical sensor and configured to:
determine a position of the stylus based on a detection of the light emitters; and
disambiguate an orientation of the stylus based on a relative position of the different emitted wavelengths.

2. The tracking system of claim 1, wherein the first and second light emitters are configured to emit different spatial patterns, and wherein the processor is configured to disambiguate the orientation of the stylus based on a relative position of the different spatial patterns.

3. The tracking system of claim 1, wherein the first and second light emitters are positioned at opposing end portions of the stylus.

4. The tracking system of claim 1, wherein the light emitters are configured to emit a series of dots arranged about a circumference of the stylus, and the processor is configured to detect rotation of the stylus about a longitudinal axis thereof based on a detection of the series of dots.

5. The tracking system of claim 1, wherein the light emitters are configured to emit a pattern that varies about a circumference of the stylus, and the processor is configured to determine an angular position of the stylus based on the pattern.

6. The tracking system of claim 1, wherein the stylus comprises a housing, wherein at least a portion of the housing comprises an infrared transmissive material, and wherein the light emitters include a light emitting diode disposed within the housing and configured to emit infrared light through the infrared transmissive material.

7. The tracking system of claim 1, wherein the head-mounted device is configured to display a virtual object at a position corresponding to the determined position of the stylus.

8. The tracking system of claim 1, wherein the stylus further comprises a camera configured to detect the head-mounted device.

9. The tracking system of claim 8, wherein the head-mounted device comprises a light emitter, the camera of the stylus is configured to detect the light emitters of the head-mounted device, and the processor is further configured to determine the position of the stylus based on detection of the light emitter of the head-mounted device.

10. An electronic system comprising:
a stylus having an elongate body, a tip at an end of the elongate body, and first light emitters longitudinally spaced apart from a second light emitter on the elongate body, the first light emitters being arranged to be separated from each other along a circumference of the elongate body, the second light emitter forming a ring that extends continuously about the circumference of the elongate body; and
a head-mounted device comprising a display configured to present graphics to a user wearing the head-mounted device, and an outward facing camera sensitive to the first light emitters and second light emitter, wherein the head-mounted device is configured to detect motion of the stylus in three-dimensional space based on detection of the first light emitters and second light emitter.

11. The electronic system of claim 10, wherein the first light emitters and second light emitter are configured to emit different spatial patterns of light, and the head-mounted device is configured to determine an orientation of the stylus based on the different spatial patterns.

12. The electronic system of claim 10, wherein:
the head-mounted device further comprises a processor coupled to the camera; and
the processor is configured to process images obtained from the camera to determine a position of at least one of the first light emitters and second light emitter, and generate images on the display containing an object at the determined position of the at least one of the first light emitters and second light emitter.

13. The electronic system of claim 10, wherein:
the tip of the stylus is configured to contact a surface to provide input to the electronic system;
the elongate body houses a battery for powering the first light emitters and second light emitter; and
the elongate body is freely movable in three-dimensional space upon manipulation by a user.

14. An electronic system comprising:
a stylus having an elongate body, a tip at an end of the elongate body, and multiple light emitters spaced apart about a circumference of the stylus, the light emitters having wavelengths that vary along the circumference; and
a head-mounted device comprising a display configured to present graphics to a user wearing the head-mounted device, and an outward facing camera sensitive to the light emitters, wherein the head-mounted device is configured to detect an angular position in three-dimensional space based on detection of the wavelengths of the light emitters.

15. The electronic system of claim 14, wherein the light emitters each have a size that is different than a size of any other one of the light emitters.

16. The electronic system of claim 14, wherein the stylus further comprising an additional light emitter forming a ring that extends continuously about the circumference of the elongate body.

17. The electronic system of claim 14, wherein:
the head-mounted device further comprises a processor coupled to the camera; and
the processor is configured to process images obtained from the camera to determine a position of at least one of the light emitters and generate images on the display containing an object at the determined position of the at least one of the light emitters.

18. The electronic system of claim 14, wherein:
the tip of the stylus is configured to contact a surface to provide input to the electronic system;
the elongate body houses a battery for powering the light emitters; and
the elongate body is freely movable in three-dimensional space upon manipulation by a user.

* * * * *